United States Patent [19]
Bartels et al.

[11] 3,934,310
[45] Jan. 27, 1976

[54] SKINNING MACHINE FOR FISH FILLETS

[75] Inventors: Alfred Bartels, Lubeck-Israelsdorf; Herbert Köhn, Bad Schwartau, both of Germany

[73] Assignee: Nordischer Maschinenbau Rud. Baader, Lubeck, Germany

[22] Filed: Oct. 15, 1974

[21] Appl. No.: 514,436

[30] Foreign Application Priority Data
July 13, 1974   Germany............................ 2433782

[52] U.S. Cl. ................................................. 17/62
[51] Int. Cl.² ....................................... A22C 25/02
[58] Field of Search ............... 17/50, 62, 52, 56, 21

[56] References Cited
UNITED STATES PATENTS

| | | | |
|---|---|---|---|
| 1,936,688 | 11/1933 | Rieske et al. | 17/62 |
| 2,173,336 | 9/1939 | Lamere et al. | 17/62 |
| 2,380,755 | 7/1945 | Hendrickson | 17/62 |

Primary Examiner—Warner H. Camp
Attorney, Agent, or Firm—Edward F. Levy

[57] ABSTRACT

A skinning machine for fish fillets including a conveying surface, an endless band knife running above the conveying surface and a knife guide in the region of the conveying surface, the knife guide being arranged adjustably by a fish fillet.

1 Claim, 2 Drawing Figures

SKINNING MACHINE FOR FISH FILLETS

BACKGROUND OF THE INVENTION

Field of Invention

The invention relates to a skinning machine for fish fillets including a machine frame, a moving conveying surface for the skin side of a fish fillet, an endless band knife slightly inclined against the direction of travel of the conveying surface, and a knife guide essentially comprising a knife support and a knife cover exposing the cutting edge of the band knife in the region of the conveying surface.

Description of the Prior Art

In U.S. application Ser. No. 411,234, filed Oct. 31, 1963, a skinning machine for fish fillets is disclosed including a flexible conveyor band passing round a roller of small diameter, an endless band cutter passing approximately tangentially to and in the region of the roller and inclined slightly to the direction of travel of the conveyor band, a guide for the band cutter exposing its cutting edge in the region of the conveyor band, a plane rigid and unyielding support plate supporting the upper run of the conveyor band and extending into the angle between the same and the roller, and pressing means mounted above the conveyor band and inclined towards it to form a wedge shaped space, such means comprising a set of presser arms mounted closely together side by side and independently pivoted and resiliently biased about an axis with their sharply cut off free ends extending close to the cutting edge of the cutter band, and a flexible apron between the presser arms and the conveyor band.

By this apparatus the fish fillets may be rapidly and reliably skinned while their silver mirror remains on them, and adaptation to different kinds of fish, fish sizes and fish qualities is possible in such a way as to permit reliable treatment of fillets of herring and mackerel as well as those of cod-like fish and flat fish.

However these skinning machines are unable to skin fish fillets of different sizes or alternating thicknesses of the skin with the same knife guide setting.

Object of the Invention

It is the main object of the invention to improve the known skinning machine for fish fillets by avoiding said before disadvantages and enabling an automatical adjustment of the knife guide above the conveying surface in dependence of the thickness of the skin to be severed from a fish fillet.

SUMMARY OF THE INVENTION

According to the present invention in a skinning machine the band knife is inclined towards the conveying surface at an angle of about 5°, its cutting edge being formed by two chamfers including a cutting angle of essentially 30° to 40° between them; the chamfer adjacent to the conveying surface includes an angle of intersection of between 10° and 20° with the latter; said knife guide is supported by a supporting arm pivoted about a shaft parallel to the cutting edge and having resting elements adjacent to the knife guide, said resting elements coacting with stop means adjustably mounted on the machine frame; and said shaft is situated close to the plane comprising the chamfer facing the conveying surface.

One exemplified embodiment according to this invention will now be described in detail in connection with the accompanying drawing.

DESCRIPTION OF THE PREFERRED EMBODIMENT

Figure 1:
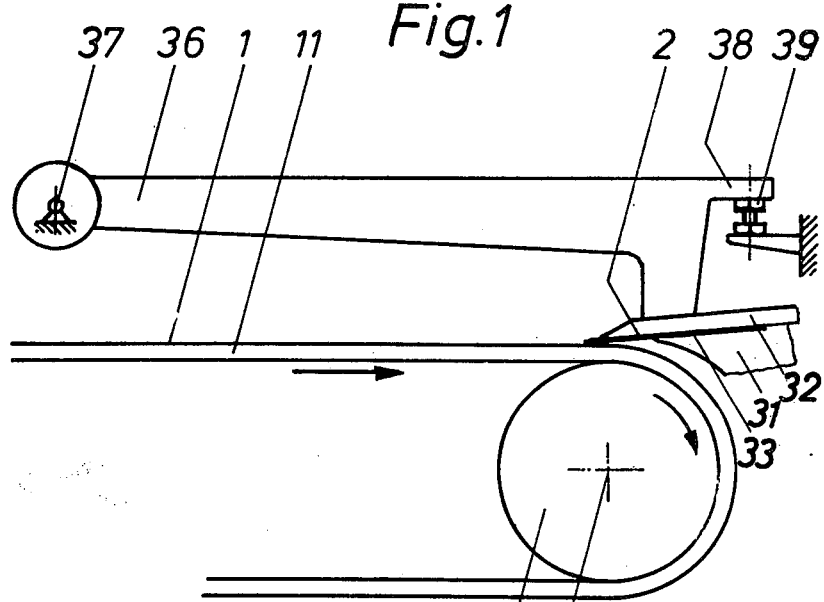
FIG. 1 is a side view of part of a fish fillet skinning machine.
Figure 2:
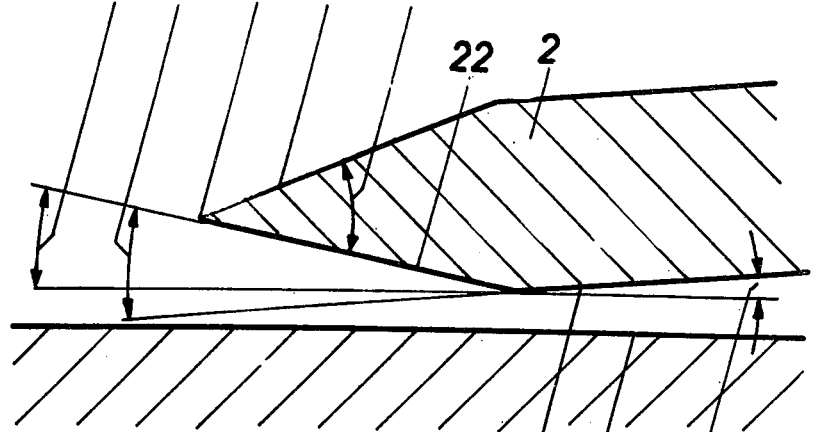
FIG. 2 is an enlarged partial view of FIG. 1 showing the zone of the knife's cutting edge.

The machine includes a conveyor belt 11 passing round a reversing roller 12 rotable round a shaft 13 mounted in a machine frame not shown and driven in any suitable manner in the sense indicated by the arrow. At least one further reversing roller is mounted freely rotatable in the machine frame. The conveyor belt 11 is a flexible endless belt, which may be supported by a support not shown fixed to the machine frame in front of the reversing roller 12, the upper side of the conveyor belt 11 forming a conveying surface 1.

Beyond the conveying surface 1 a supporting arm 36 is arranged pivotably about an axis 37 mounted on the machine frame and resting with protruding stop faces 38 on a pair of stops 39 adjustably mounted in the machine frame. Adjacent to the stop faces 38 a knife guide is fixed to the supporting arm 36 from below. Said knife guide comprises a knife support 31 with a plane guide surface 34 inclined towards the conveying surface 1 and including an angle 35 with the latter. On its upper side the knife support 31 has a recess. Together with a slender knife cover 32 fixed to the knife support 31 from above said recess forms a slot 33 for the band knife 2. The endless band knife 2 is driven and reversed over two wheels not shown supported in the machine frame. On crossing the conveying surface 1 the band knife 2 is guided in an exact manner by means of the knife guide 31, 32. The cutting edge 21 projecting from the knife guide is formed by two chamfers 22 and 23, which include between them a cutting angle 24. With the plane guide surface 34 chamfer 22 facing the conveying surface includes an angle 25, thus forming an angle of intersection 26 with the conveying surface 1. If said angle of inclination 35 is 5° and said angle of chamfering 25 is 17° the angle of intersection 26 is 12°. The cutting angle 24 may be between 30° and 40°.

In operation a fish fillet deposited with its skinside onto the conveying surface 1 is moved to the right in the sense of the arrow. When the tail portion of the fish fillet arrives at the band knife 2 the cutting edge 21 of the latter begins to make an incision in it just above the true skin of the fish fillet. Whilst the band knife 2 continues to separate the fish fillet from the skin, the latter is pushed under the inclined chamfer 22 and gives buoyancy to the band knife 2 and the knife guide, thus pivoting the supporting arm 36 anticlockwise and lifting the stop faces 38 from the stop 39. In this the fish fillet will be skinned in a manner avoiding skin patches and conserving the "silver mirror" on the fillet.

It should be observed, that the conveying surface may by choice be formed by an endless conveyor belt or a hollow cylinder rotating about a horizontal axis, the latter preferably having a refrigerated surface being advantageous for skinning fillets of flat fish or the like.

What we claim as our invention and desire to secure by Letters Patent is:

1. A skinning machine for fish fillets including a machine frame, a moving conveying surface for the skin side of a fish fillet, an endless band knife slightly inclined against the direction of travel of the conveying surface, and a knife guide essentially comprising a knife support and a knife cover exposing the cutting edge of the band knife in the region of the conveying surface, wherein the band knife is inclined towards the conveying surface at an angle of about 5°, its cutting edge being formed by two chamfers including a cutting angle of essentially 30° to 40° between them; the chamfer adjacent to the conveying surface includes an angle of intersection of between 10° and 20° with the latter; said knife guide is supported by a supporting arm pivoted about a shaft parallel to the cutting edge and having resting elements adjacent to the knife guide, said resting elements coacting with stop means adjustably mounted on the machine frame; and said shaft is situated close to the plane comprising the chamfer facing the conveying surface.

* * * * *